(12) United States Patent
Salinger et al.

(10) Patent No.: US 11,700,211 B2
(45) Date of Patent: *Jul. 11, 2023

(54) DATA NETWORK TRAFFIC MANAGEMENT

(71) Applicant: Comcast Cable Communications, LLC, Philadelphia, PA (US)

(72) Inventors: Jorge Salinger, Littleton, CO (US); Saifur Rahman, Lindenwold, NJ (US); John Bevilacqua, Boulder, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 566 days.

This patent is subject to a terminal disclaimer.

(21) Appl. No.: 13/838,427

(22) Filed: Mar. 15, 2013

(65) Prior Publication Data

US 2013/0268984 A1 Oct. 10, 2013

Related U.S. Application Data

(60) Provisional application No. 61/622,366, filed on Apr. 10, 2012.

(51) Int. Cl.
*H04L 47/80* (2022.01)
*H04N 21/654* (2011.01)
*H04N 21/647* (2011.01)
*H04L 41/0896* (2022.01)

(52) U.S. Cl.
CPC ........ *H04L 47/806* (2013.01); *H04L 41/0896* (2013.01); *H04N 21/64738* (2013.01); *H04N 21/64769* (2013.01); *H04N 21/654* (2013.01)

(58) Field of Classification Search
CPC ......... H04N 21/4622; H04N 21/64738; H04N 21/64769; H04N 21/654; H04L 47/806; H04L 41/0896
USPC ........................................................ 725/109
See application file for complete search history.

(56) References Cited

U.S. PATENT DOCUMENTS

2012/0185906 A1* 7/2012 Doets et al. .................. 725/109

* cited by examiner

*Primary Examiner* — Jeff A Burke
*Assistant Examiner* — Sihar A Karwan
(74) *Attorney, Agent, or Firm* — Banner & Witcoff, Ltd.

(57) ABSTRACT

A network management system may allocate different amounts of bandwidth to different types of data traffic. The traffic types may be distinguished by their source device address, and whether the source device is part of, or external to, a first network. Packets may also be marked by their sender with information to identify a traffic type, and the marking may be used to determine the packet's treatment. The allocations given to the various types of traffic may be dynamically modified with changing traffic demands and conditions.

18 Claims, 7 Drawing Sheets

DATA NETWORK TRAFFIC MANAGEMENT

CROSS-REFERENCE TO RELATED APPLICATIONS

The present application claims priority to U.S. Provisional Application No. 61/622,366, entitled "Data Network Traffic Management," filed on Apr. 10, 2012, the contents of which are hereby incorporated by reference as an example embodiment.

BACKGROUND

Our appetite for data is growing at a rapid pace. Today, a myriad of data network features, such as streaming audio and/or video content, online interactive video games, network/Internet telephony, software downloads from and uploads to remote network servers (e.g., in "the cloud"), social media, second screen content viewing experiences, and web pages place an increasing demand on data delivery networks.

Data network operators struggle to keep up with the demand, and there is an ever-present need to maximize the efficiency with which existing networks, both wired and wireless, are used to transmit data.

SUMMARY

The features herein include methods, systems and apparatus for managing traffic on a data network. In some embodiments, an available amount of bandwidth (e.g., on a portion of a network, on a single modulator, or on a plurality of grouped modulators) may be allocated to different data traffic types. Some of the traffic types may be determined based on whether a source of the data lies within, or outside of, a service network. The allocations may then be enforced on traffic based on, for example, inspections of data traffic headers and/or the network information such as content of packets in the data traffic. In some embodiments, traffic may be classified based on a network address in their packet headers.

In some embodiments, multiple bandwidth allocations may be established for digital voice and managed video (unicast, multicast, broadcast, etc.) data. The allocations may specify or include specific bandwidth resources, and may alternatively (or additionally) include ranges, such as a minimum and a maximum bandwidth value to be preserved in subsequent bandwidth reallocations.

In some embodiments, multiple minimum allocations may be established, and managed video traffic originating from a source internal to a first service network may be given its own minimum allocation, different from a minimum allocation established for unmanaged traffic, that may include video data and non-video data. Some embodiments may include enforcing a bandwidth allocation for managed video traffic, and preventing managed non-video traffic and unmanaged traffic, that may include video and non-video traffic, from consuming bandwidth allocated for the managed video traffic.

In some embodiments, a data type may be given two different minimum levels, with different responses established for when actual traffic associated with the data type falls to the minimum levels.

These and other aspects will be described in connection with the drawings in the Detailed Description portion of this disclosure.

DETAILED DESCRIPTION

Figure 1:
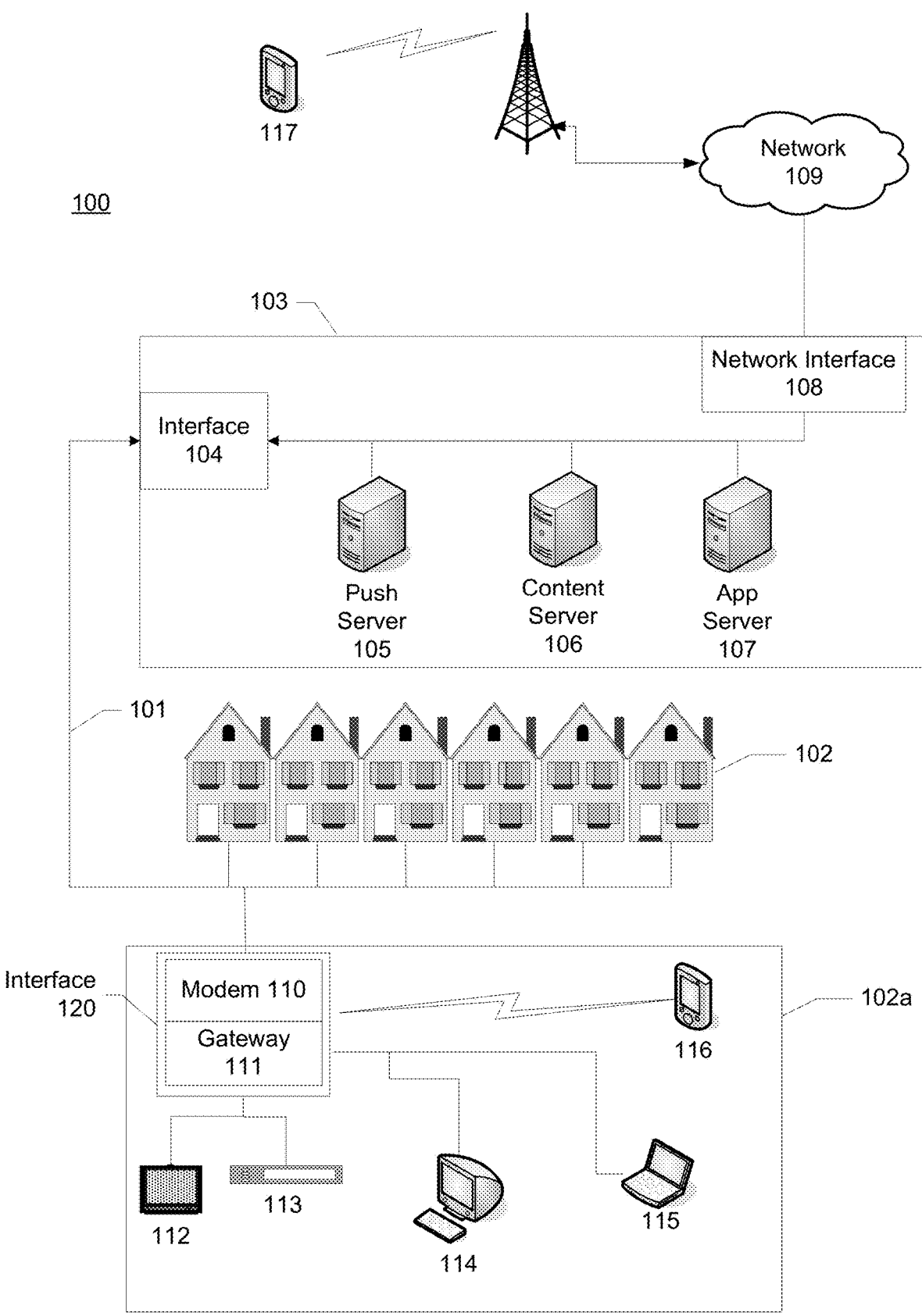
FIG. 1 illustrates an example system on which features described herein may be implemented.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, central office, a processing facility, etc.). The local office 103 may transmit downstream information signals onto the links 101, and each premises 102 may have a receiver used to receive and process those signals. The geographic location of the local office 103 can vary, and the local office 103 may be proximate to a user's neighborhood in some embodiments, while in other embodiments, the local office 103 may be remotely located at a centralized location. The various servers may be located anywhere, and their location need not be relevant to a user (e.g., the servers may be in the "cloud").

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The various premises 102 may be connected (through wiring and/or wireless connections) to one another, forming a local premises access network operationally distinct from another local access network. The connected homes forming a local premises access network may be located near one another, such as neighboring townhomes, individual apartments in a downtown highrise, or the like. For example, a local premises access network may include the various premises 102. Another group of homes (not shown) may form a separate local premises access network. The local premises access network of the various premises 102 may be identifiable from the separate local premises access network. A local premises access network may also be associated with a particular geographic region (e.g., city, county, geographic area, etc.). In some embodiments, homes connected to a termination system (TS), such as a modem termination system (MTS), may form a local premises access network.

The local office 103 may include an interface 104, such as a termination system (TS) or a cable modem termination system (CMTS) in an example of an HFC-type network, which may be a computing device configured to manage communications between devices on the network of links 101 and backend devices such as servers 105-7 (to be discussed further below). In the example of an HFC-type network, the MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., LTE, WiMAX, etc.), satellite networks, and any other desired network, and the interface 108 may include the corresponding circuitry needed to communicate on the network 109, and to other devices on the network such as a cellular telephone network and its corresponding cell phones. Collectively, these networks 109 may be referred to herein as "the cloud" or "cloud architecture."

As noted above, the local office 103 may include a variety of servers that may be configured to perform various functions. For example, the local office 103 may include a back office server 105. The back office server 105 may generate push notifications related to functions such as billing, reporting, and subscriber management 400 to deliver data and/or commands to the various premises 102 in the network (or more specifically, to the devices in the premises 102 that are configured to detect such notifications). The local office 103 may also include a content server. The content server 106 may be one or more computing devices that are configured to provide content to users, who may be, for example, in the homes. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device. Other server computing devices may be present as well. Also, the various servers and elements are depicted in a local office 103, but they need not be co-located in a common premises, and instead may have some or all elements remotely in the network 109.

The local office 103 may also communicate with one or more application servers 107 maintained in the cloud 109. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

An example premises 102a may include an interface 120, which may include a modem 110 (or another receiver and/or transmitter device suitable for a particular network), which may include transmitters and receivers used to communicate on the links 101 and with the local office 103. The modem 110 may be, for example, a coaxial cable modem (for coaxial cable lines 101), a fiber interface node (for fiber optic links 101), or any other desired modem device. The modem 110 may be connected to, or be a part of, a gateway interface device 111. The gateway interface device 111 may be a computing device that communicates with the modem 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops and netbooks, mobile phones, mobile televisions, tablet computers, PDA, etc.), and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), 3G, WiMax, LTE, Bluetooth interfaces, and others. In some embodiments, the system uses ZigBee and Z-Wave compliant devices.

Figure 2:
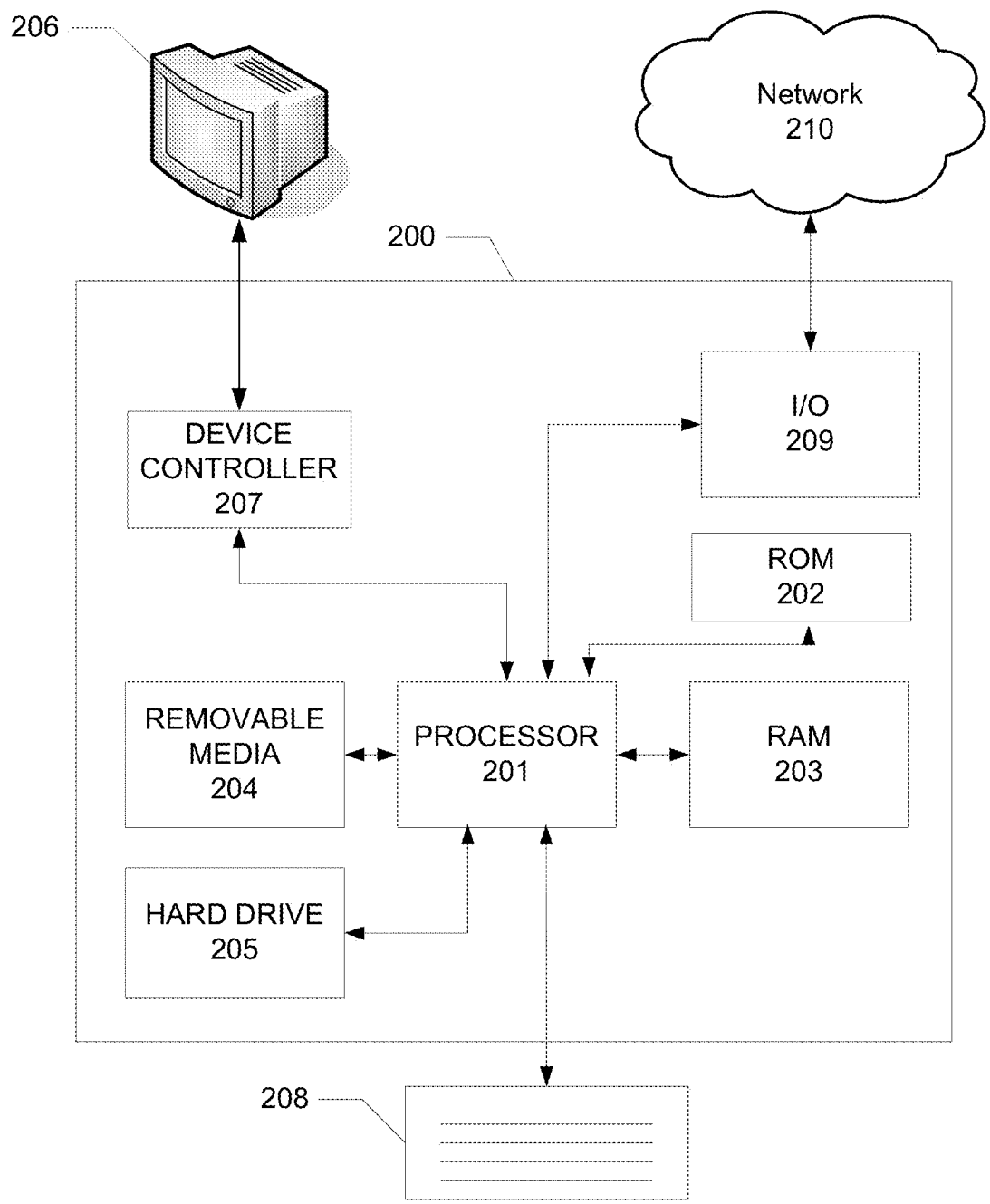
FIG. 2 illustrates an example computing device that may be used to implement any of the computing devices and servers described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

The FIG. 2 example is an example hardware configuration. Modifications may be made to add, remove, combine, divide, etc. components as desired. Additionally, the components illustrated may be implemented using basic computing devices and components, and the same components (e.g., processor 201, storage 202, user interface 205, etc.)

may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in computer-usable data and/or computer-executable instructions, such as in one or more program modules, executed by one or more computers or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

As discussed above, the local office of an information distribution or access network may transmit information downstream to various user devices. The transmitted information may include content (e.g., audio, video, Internet data, etc.) for consumption (e.g., playback, viewing, listening, display, storage, etc.) by a user via user equipment, such as a gateway interface device (e.g., gateway interface device 111 of FIG. 1) and/or other computing device (e.g., televisions 112, additional STBs 113, personal computers 114, laptop computers 115, wireless devices 117 of FIG. 1). To assist in providing the content to a user, a content provider may implement in their distribution network an information distribution management system that includes one or more information distribution management devices (e.g., one or more servers and/or other devices) configured to perform various processes related to managing the providing of content to the user equipment (e.g., user device) The features herein include techniques, systems, apparatus, and methods for mapping trick modes of operation in connection with the playback of media content wherein the trick modes of operation are mapped to alternate advertising or other media content. The features will be described hereinbelow primarily in connection with an embodiment in a television service network, such as a cable television network. However, it should be understood that this is merely exemplary. The features may be implemented in connection with any form of media content, including audio content, video content, and multimedia content, and in connection with any number of delivery mechanisms for such content, including television networks, media delivered via the Internet or another information network, media stored on any digital medium, including, but not limited to, DVDs, CDs, solid-state memory, and hard disk drives such as found in computers and DVRs.

Figure 3:
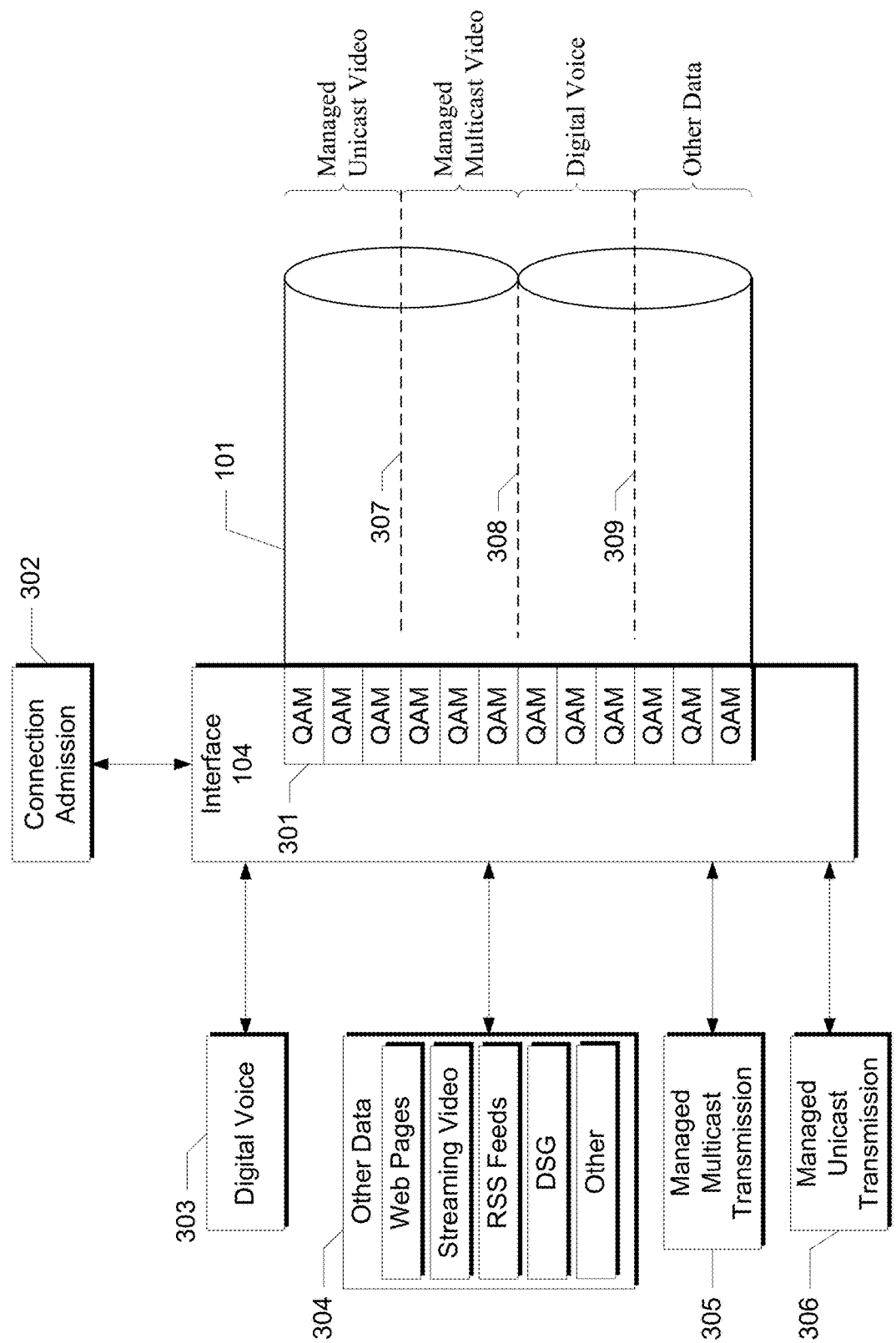
FIG. 3 illustrates an example connection admission system at a local office, along with an example bandwidth allocation.

FIG. 3 illustrates an example embodiment of the downstream transmission portion of a data network, e.g., on links 101, used to support a particular group of users (e.g., a service group in the neighborhood of premises 102 shown in FIG. 1). In the example, the links 101 may include a plurality of links (e.g., coaxial cable, optical fiber, wireless, etc.), and each link may be driven by a computing device such as a modulator, e.g., quadrature amplitude modulator (QAM) 301. Each QAM 301 may modulate one or more signals onto a corresponding line, such that each link may carry one or more channels of data, depending on the particular type of modulation and encoding desired. The various channels of data may form an overall bandwidth on the links 101 connected to the interface 104, and this overall bandwidth may be managed by a connection admission computing device 302, which can allocate portions of the available bandwidth to different uses. Although QAMs are used in the example described herein, the various features described may be employed with any desired type of available bandwidth, such as other forms of modulation (e.g., optical, wireless, etc.) as well as logical groupings of bandwidth on Internet Protocol (IP) networks, MPEG networks, and the like.

The different uses may include a variety of computing devices that offer various services to users and/or devices at the premises 102. For example, a digital voice computing device 303 may encode and decode voice communications to carry them with a public switched telephone network (PSTN), cellular telephone network, or other voice network.

Other data services may exist as well, and may be offered by one or more network data computing devices 304, which may be web services or Internet computing devices that offer a variety of functionality. For example, these services may include the display of web pages, advertisements, streaming of video, audio or audiovisual media (e.g., videos on demand, streaming music, etc.) or other data (e.g., real-simple syndication (RSS) news feeds, live updates etc.). In some example embodiments, the services may provide DOCSIS Set-Top Gateway (DSG) data in an example of a HFC-type system for gateways and/or set-top boxes, or other data. Such data may be referred to herein as high-speed data (HSD), and in some examples may carry DSG data, and in some embodiments, this other data may include a 2 Mbps DSG tunnel used by consumers.

In addition to the data services described above, the bandwidth in the links 101 may also be used to offer video services that are managed and/or offered by a common entity, such as the owner or operator of the interface 104 and/or local office 103. The managed video services may include a managed multicast video server 305 that provides multicast video or any other multicast transmission using a schedule, such as a scheduled digital broadcast of television services such as ABC, NBC, CBS, etc., that may be received and used by a plurality of users. The managed video services may also include a managed video on demand (VOD) unicast server 306, which can provide unicast video streams (or any other desired unicast data) on an on-demand basis for individual users. In some embodiments, a service, and its associated data, may be considered "managed" if the service's source computing device (or devices) lies within a first network, or is commonly owned, or under the control of a common management. Conversely, a service may be considered "unmanaged" if the service's source is external to the first network. An example of this may be seen with local offices 103 that offer video and Internet services to customers. On-demand video servers may reside in the local offices 103 (or are otherwise part of the same network controlled by the local office 103), and may be considered "managed sources," while other Internet servers that reside outside of the local office 103 may be considered "unmanaged," as they are not controlled by the local office 103.

As illustrated in FIG. 3, groups of the links (and/or their corresponding channels of data) may be combined to offer an overall available bandwidth. In the illustrated example, the topmost three (3) QAMs 301 have their links pooled together to offer data bandwidth reserved for the managed unicast video server 306, while the bottom three (3) QAMS 301 have their links pooled together to offer a secondary bandwidth reserved for the managed multicast video server 305 These managed video services may employ channel bonding techniques to share this bandwidth. Similarly, the next three QAMs 301 are shown as being reserved for the digital voice server 303, and the remaining three QAMs 301 may be reserved for carrying data from the other servers 304. In some embodiments, the digital voice and DSG services may be single channel bandwidth consumers, in which case they are only able to receive a single QAM channel. The allocation of bandwidth may include identification of boundaries between the allocated bandwidth portions. For example, there may be a boundary 307 between the managed unicast and multicast video portions; a boundary 308 between the managed video portions and the rest of the data (e.g., the digital voice and network data); and another boundary 309 between the digital voice data and the other data portions. As will be discussed further below, these boundaries may be dynamically adjusted to control the traffic flow on the bandwidth of the links 101.

In some embodiments, the division of bandwidth may itself be further divided. For example, the Other Data (e.g., DSG/HSD) and Digital Voice traffic groups may themselves be combined and treated as one traffic group with its own allocation that is then further subdivided between Digital Voice and the Other data. Similarly, the Managed Unicast and Managed Multicast traffic groups may together share a single allocation that is further subdivided by boundary 307. By having these two primary groupings, separated by the boundary 308, each with their own respective allocations and min/max limits, the service level may be managed to help ensure a certain quality of service. For example, the managed video services offered to users may be guaranteed to never fall below a minimum value for its primary grouping, so that even if the Other Data and Digital Voice services place greater demands on the available bandwidth, they do not interfere with the established minimum level of service offered to the managed video services. Conversely, having minimum values for the Digital Voice and Other Data traffic groups also helps ensure their service levels in the event of excessive demand for managed video services.

In alternative embodiments, the entirety of the bandwidth may be treated as one monolithic bandwidth, divided by the boundaries 307-9. The FIG. 5 example illustrates this alternative.

The example shown in FIG. 3 uses different QAM links 101 as units of division, and different QAMs may have their channels grouped together, or bonded, for treatment as a group. The allocation of the bandwidth, however, need not be done on a QAM link 101 basis, and the bandwidth of a single QAM may be divided into multiple different groups. For example, different data flows, MPEG transport streams, or time slots of a QAM's transmission may be allocated for different uses, allowing the boundaries 307-9 to be placed within the bandwidth of a single QAM.

The management and control over the bonding of channels and allocation of resources may be controlled by a processor, such as the connection admission computing device 302, executing instructions stored in a memory, such as ROM 202. The memory may also store a data table identifying how the available bandwidth is allocated. This may include an identification of the overall available bandwidth, and may also indicate the location of the boundaries 307-9 and the specific portions of the available bandwidth that are allocated for the different traffic types. For example, the data table may identify the MPEG dataflows that are allocated to the managed multicast video service, and the dataflows that are allocated to the digital voice, managed unicast video, and other data services. The following are some example data values that can be stored in the data table for this purpose:

Digital Voice Min—a minimum amount of bandwidth that will be preserved for digital voice traffic, even if active phone calls currently consume less than this amount. For example, this value may be expressed as a total value (e.g., 100 Mb).

Digital Voice Max—a maximum amount of bandwidth that will be allocated for digital voice traffic.

Digital Voice Allocation—an identification of individual service flows, transport streams, QAMs or channels (e.g., QAM A and C; or channels 2 and 3 in QAM A), an identification of time division time slots, or any other desired way of expressing a portion of the total available bandwidth that are assigned to carry data for the digital voice service.

Similar minimum, maximum and allocation data may be stored for the managed unicast, managed multicast, and other types of reserved bandwidth discussed above.

Current Boundary Positions—indications of the locations of the boundaries 307-9. Note that with the storage of the bandwidth allocation information, the various data flow assignments are already represented, and this boundary position information might not be necessary. Nevertheless, the boundary positions are useful herein for describing how the allocations may be shifted over time.

An advantage of the FIG. 3 embodiment comes from the fact that, for example, the DSG/HSD allocation is separated from the unicast/multicast video allocations, and may be transmitted in separate downstream channels and/or bonding groups. By having them separated, users are assured that even if the HSD demand spikes (e.g., due to a number of users in the service group suddenly initiating large file downloads), the video quality of their unicast or multicast video will not be disturbed.

Figure 4A:
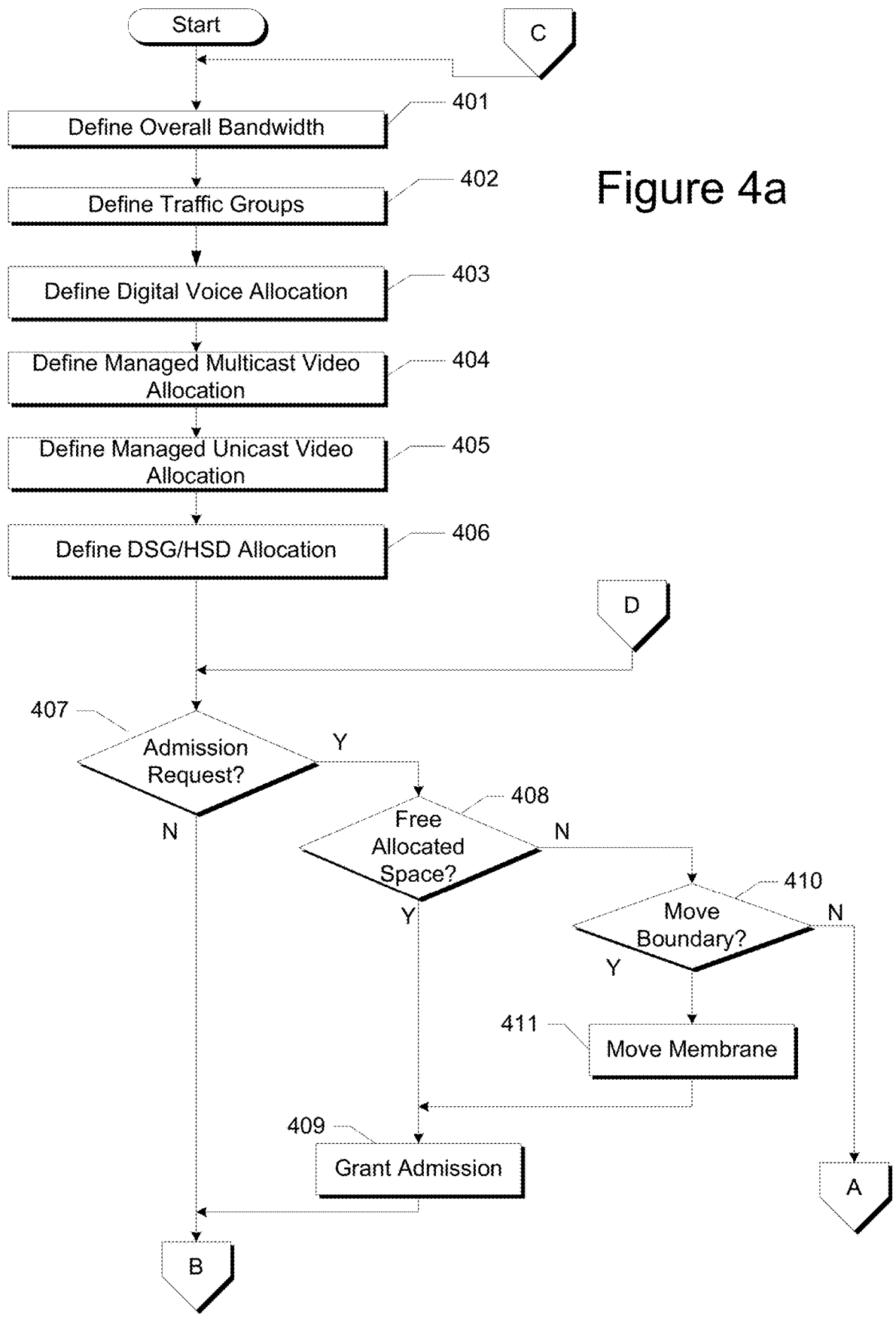
FIGS. 4*a*&*b* illustrate an example bandwidth allocation management method.

FIGS. 4a&b illustrate an example method of enforcing the data bandwidth allocation discussed above. The method may be performed by the connection admission computing (CAC) device or processor 302, which can be a processor 201 that is configured to manage the QAMS 301 according to the allocations in the data tables discussed above.

In step 401, the CAC processor may begin by defining the communication resources that are available for allocation. The communication resources may be hardware, such as downstream transmitters and upstream receivers, and they may also be logical allocations of hardware resources, such as transmission flows, time slots, or DOCSIS service flows. In some embodiments, a service flow data table may be stored by the CAC processor. The service flow data table may identify a plurality of data types or services, and for each service, the table may identify whether data from that service is subjected to the bandwidth management of the CAC processor, as illustrated below:

| Service Flow | CAC? | Min/Max |
| --- | --- | --- |
| Best Effort traffic (e.g., Internet pages) | No | N/A |
| Managed Voice | Yes | 30 Kbps/20 Mbps |
| Managed IP Video | Yes | 25 Mbps/100 Mbps |

In the example depicted above, best effort traffic, such as traffic carrying Internet page requests for a user's web browser, may be excluded from the CAC processor's bandwidth management. That traffic may simply be granted available bandwidth if it is available, without any reserved minimums or maximums. The managed voice and IP video services, however, are indicated as being subject to CAC processing, and may be given the listed minimums/maximums (or other Quality of Service parameters).

The identification of communication resources may be done, for example, by identifying one or more QAMs 301 that will be part of the bandwidth discussed above. This initial identification may be performed in response to a user configuring the local office 103, or it may be done automatically as an adjustment to a pre-existing allocation. For example, the processor may be programmed to determine when an additional QAM is added to the network, or if the primary bandwidth usage exceeds the secondary bandwidth usage by a predetermined amount for a predetermined amount of time, and in response the processor may adjust the bandwidth allocation to include the new QAM 301.

In step 402, the CAC processor may define the groups of traffic that will be managed through the allocations. The groups can be defined using a variety of criteria. For example, a traffic group may be defined by the data traffic type, such as digital voice and managed unicast video. The groups may also be defined based on sending or receiving device. For example, a device having IP address of 1.11.11.111 may be assigned to a first group, while a device having IP address of 2.22.22.222 may be assigned to a different group. Combinations of these criteria may also be used to define the traffic groups. For example, digital voice traffic from a device having address 1.11.11.111 may be assigned to a first traffic group, while managed unicast video from that same device, and from a device having an address of 2.22.22.222, may be assigned to a second traffic group.

Identifying a data traffic group may also include determining how data in that group can be detected. In some instances, the network address (e.g., Internet Protocol (IP) address, Media Access Control (MAC) address, etc.) of the sender (or recipient) may be used to indicate the data's type. This is useful in situations where a given device has a single use, such as a voice over IP digital telephone set, and the data traffic to and from the device may be assumed to be of a certain type (e.g., digital voice). To support this type of device, the determination of a traffic group 402 may include the CAC processor storing data identifying the network address of the device, and correlating it to the traffic type of digital voice.

In other instances, the network address alone may not be sufficient to uniquely identify the data traffic group of a particular transmitted packet. For example, some devices may support multiple functions, such as a smartphone that can execute both a voice over IP digital voice session and a managed unicast video session. To support such multiple-function devices, the identification of a traffic group may further identify a data pattern or other characteristic that can be used to determine that a particular transmitted packet belongs to a predetermined traffic group. For example, digital voice traffic might include a predetermined packet header with a digital voice code, and in those situations, the identification of the traffic group may also identify this header code. Similarly, other traffic types may use different codes to identify themselves (e.g., a code for unicast on demand streaming of video, and another code for multicast streaming of scheduled content). The absence of a traffic code in the header may also be used to identify the traffic type. For example, data from an unmanaged source (e.g., a source outside of the control of CAC processor 302) might not include a recognized traffic type coding in the packet header, and the absence of such a code in the packet header may be interpreted by the CAC 302 as signaling content from an unmanaged source. Traffic from such an unmanaged source may be subject to different bandwidth allocation treatment, as compared to traffic from a managed source.

For all of the traffic groups, the CAC processor may store a data file containing the information identifying the member devices of the group, their data characteristics, and any other desired information about the group and/or its traffic. As will be noted below, this data may be used by the CAC processor to govern the usage of the available bandwidth.

Figure 4B:
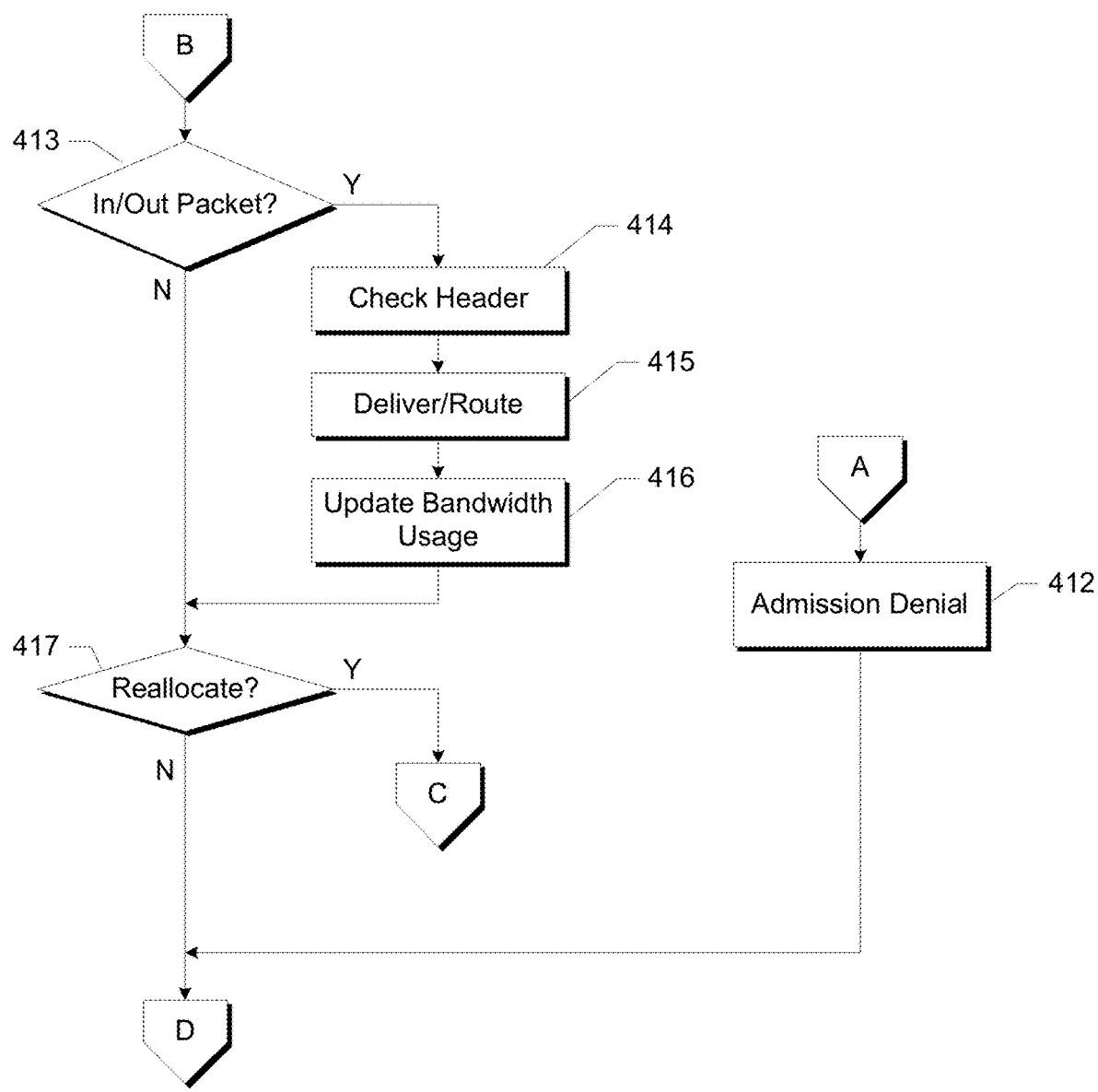

In step 403, the CAC processor may define an allocation of bandwidth resources for the digital voice traffic group. Allocating resources may include identifying the specific QAMs 301, channel frequencies, byte limits, or timeslots that will be granted to the particular traffic group. This identification may be expressed as a percentage, with the implementation of the percentage to be carried out during the data transmission. For example, the CAC processor may indicate in step 403 that digital voice is to receive 40% of the bandwidth on a first QAM. The example above describes allocating specific bandwidth resources to the traffic group. In some embodiments, the specific bandwidth resource might not be assigned ahead of time, and may instead be dynamically assigned by the CAC processor on an as-needed basis, based on traffic demands. For such systems, the allocation of bandwidth in step 403 need not specifically identify specific QAMs or channels, but may instead identify a bandwidth amount, or a range of amounts, that should be reserved for the digital voice traffic group. For example, the allocation in step 403 may simply indicate that at least 500 Mbps of bandwidth be made available for digital voice calls. As will be noted below, the CAC processor may be sure to maintain this minimum level of available bandwidth for digital voice calls when handling requests for bandwidth usage. The allocation may include establishing a digital voice minimum bandwidth and a digital voice maximum bandwidth. In step 404, the same bandwidth allocation may be conducted for the managed multicast video traffic group. Data may be stored to identify the QAMs, channel frequencies, timeslots, or portions thereof that are granted to the multicast video traffic group. Step 405 may do the same to allocate bandwidth to the managed unicast video traffic group, and in step 406, the same bandwidth allocation may be conducted for the other type of data, which can include the DSG/HSD data discussed above. Although video is used as an example, the types of data being managed may be any other type of data transmission, and the algorithm may include additional steps (not shown in FIG. 4) of defining allocations for different types of data transmissions.

In step 407, the processor may determine whether one or more admission requests have been received. An admission request may be a request from any device to use any of the allocated bandwidths described above. For example, a video content server 106 may transmit an admission request to the processor, requesting to initiate a unicast video transmission in response to a user's request to begin viewing a streaming video on demand. The request itself may be in packet form, and the request packet may include information identifying the requesting device, the requesting service, the intended recipient (e.g., MAC address, IP address, user name, etc.), the transmission characteristics (e.g., expected bitrate, encoding type, name and type of content to be delivered, etc.), the expected duration of the transmission. To determine whether the request is to be granted, the CAC processor may first classify the request to determine which allocation will be used to carry it. This classification may be done, for example, by comparing the admission request with the data stored above in step 402, to find a matching network address or data characteristic pattern. If the particular request does not fit into a predetermined traffic group, it may be assigned to a default group (e.g., the DSG/HSD traffic group may be a default group).

If a request has been received, then in step 408, the CAC processor may determine whether there is enough allocated space for the corresponding traffic group to carry the desired content, based on the classification from step 407, the desired quality of service for the transmission, and the allocations discussed above in the primary and secondary bandwidths. This can be done, for example, by comparing the desired bandwidth amount and duration with the existing schedule of the corresponding bandwidth, and determining if there is open availability. For example, the CAC processor may maintain a log of bandwidth usage, and may determine an average available bandwidth over a recent time period (e.g., last minute), and make a determination as to whether that available bandwidth is sufficient for the requested content. In some embodiments, the CAC processor may employ a priority hierarchy to determine which requests should be granted. For example, the processor may store a predetermined list of prioritization criteria for the traffic. The prioritization criteria may, for example, identify multiple levels of priority (e.g., high, medium, low), and may identify specific devices whose traffic is assigned a particular level of priority (e.g., all data from computer ABC is of low priority). The priority may also be based on other factors. For example, particular data types may be given predetermined priorities. An HSD download of a streaming video file may be given a higher priority than an HSD download of a static Internet page or photo file, since the streaming video may be less tolerant of delivery delays (e.g., a 50 ms delay in a video packet may cause a visible disturbance in the playback quality, whereas a 50 ms delay in delivering a static Internet site is likely to go unnoticed by the user). In some embodiments, bandwidth being consumed by low priority applications may be considered "available" for purposes of evaluating a request from a high priority device or carrying high priority data. In such a situation, the higher priority request may be granted bandwidth, and the processor may delay or revoke an allocation previously granted to the lower priority traffic.

If there is available bandwidth, then in step 409, the processor may grant the admission. In doing so, the CAC processor may update its bandwidth schedule data to indicate the granted usage, and may also send a message back to the requesting device, indicating that the request is approved. The response may also include details as to how the requesting device should send its data. For example, the response can include a marker value that the requesting device should insert into the headers of packets that are sent using the allocated bandwidth, and/or a security key to be used to sign the transmitted data for authentication and/or encryption. The response may provide an address to which the requesting device should direct future transmissions in the granted allocation (e.g., an IP address to which future packets should be sent).

If there is no available bandwidth, or if the available bandwidth is insufficient to satisfy the request (e.g., the available bandwidth is not fast enough in terms of data per unit time, or if the duration of an available portion is shorter than the desired duration of the transmission), then the CAC processor may determine, in step 410, whether to adjust its own internal allocation of the bandwidth to accommodate the request. In other words, the CAC processor may determine whether a boundary 307, 308, 309 should be moved to increase the allocation for one desired type of data transmission. For example, if the request is to initiate a video streaming download from an unmanaged source, then such a download would occur using the DSG/HSD allocation, but if the allocation for DSG/HSD data is currently fully consumed (or otherwise insufficient to satisfy the request), then the CAC processor may determine whether the DSH/HSD allocation portion of the bandwidth should be increased to accommodate the new request.

To make this determination, the CAC processor may compare the current boundary position with the relevant minimum and maximum values defined above for the relevant traffic group. For example, if the request would require increasing the DSG/HSD beyond its maximum, or if increasing the DSG/HSD allocation would result in lowering the digital voice allocation to below its minimum, then the determination would be to not move the boundary, and to deny the request instead. In some embodiments, the determination of whether to move a boundary can depend on the current actual usage of allocated bandwidth. For example, each boundary position may have a corresponding effective range, and the boundary might only be enforced by the CAC processor if the usage of the allocated bandwidth falls within the effective range. For example, if managed video is given an allocation of 30% of an overall available bandwidth, the effective range might be 25-30%. If the usage by the managed video source falls outside of that range (e.g., is below 25%), then the CAC process might not bother enforcing the managed video's bandwidth boundary, and may instead make some of the managed video's allocated bandwidth (e.g., the portion above 25%) available for use by other sources. In other words, the boundary might only be enforced if needed—if the managed video is close to actually using up its allocation. Alternatively, the boundaries might be ignored if the total amount of available bandwidth is sufficient to handle the total amount of current requests. The CAC processor may monitor the current bandwidth demand, and if the demand falls below the maximum (or below some threshold), then the CAC processor may simply freely allow requests for usage of the bandwidth. However, if the total demand exceeds the total available bandwidth, or if the total demand comes within a predetermined range of the total available bandwidth (e.g., 95% or more of the total available bandwidth), then the CAC processor may enforce the bandwidth boundaries. In instances where a boundary is not enforced, it may be moved to a different level approximating the current level of usage. For example, if the managed video source is only using 20%, then its boundary may be temporarily moved from the original 30% level to 21%, freeing up an unused portion of the managed video allocation to be used for other types of data.

If the boundary is determined to be moved, then in step 411, the CAC processor may adjust its schedule and allocation table to reflect the new allocations, and can proceed to step 409 and grant the request. If the boundary is determined to not be moved, then in step 412 the CAC processor may deny the admission request. This denial may include sending a message back to the requesting device, indicating that the request has been denied. In some embodiments, this denial may include information identifying a condition that needs to be satisfied for a future request from the requesting device to be granted. For example, the denial may indicate to the requesting device that it should not send any further requests for admission until at least some minimum amount of time (e.g., 20 seconds) has passed. As another example, the denial may identify a new bandwidth or duration of availability that the requesting device may use for a future request. The new bandwidth or duration may be determined by the processor based on its own availability. For example, if a bandwidth of 4 Mb/s is available, but the requesting device originally requested a bandwidth allocation of 8 Mb/s for that time, the denial may indicate that a 4 Mb/s request may be granted if the requesting device wishes to make a subsequent request with that alternative bandwidth value.

In step 413, the CAC processor may determine whether an incoming or outgoing packet is ready for transmission in one of the allocations. Packets that are to be sent using one of the granted allocations may be directed to a predetermined location, such as an address supplied by the CAC processor in the grant message. Those packets may be received in step 413, and in step 414, the CAC processor may check the headers of the packets to identify the allocation to which the packet belongs, where it should go, and any processing of the packet (e.g., encryption, transcoding, etc.) that should occur before it is delivered.

In step 415, the packet can then be routed to its next destination (e.g., the data can be placed in the bandwidth for reception by the destination device.

In step 416, the CAC processor can update its own bandwidth schedule table to indicate that the packet was forwarded. By doing so, the CAC processor may track how the requesting device is actually using the allotted bandwidth. This historical tracking information can be used in determining whether to grant subsequent allocation requests from the device or for similar services. For example, if the request asked for 8 Mb to deliver a data file, but the actual delivery only consumed 2 Mb of bandwidth, then the next time that requesting device (or another device requesting to deliver the same file) requests another 8 Mb allocation, the CAC processor can potentially deny the request, and/or indicate that a smaller amount can/will be granted based on historical actual usage.

In step 417, the CAC processor can determine whether the existing allocations and boundary placements should be adjusted and/or reallocated. The historical information noted above may also be used for this purpose. For example, the processor may be configured to try and maintain an actual usage level that is at or below a predetermined percentage of the allocation, such that the processor tries to ensure that only 70% of the allocated digital voice bandwidth is in use (or that 30% of the allocation remains available for new calls). If the measured actual usage deviates from the predetermined percentage, then the CAC processor can reallocate the bandwidth to perhaps give more bandwidth to the digital voice allocation, particularly if the DSG/HSD usage is also consistently below a corresponding target, such that its allocation is currently excessive. The reallocation may also be based on predicted demand. For example, the CAC processor may store historical information regarding bandwidth demands over time, and can identify times of day when requests usually increase or decrease by a predetermined amount. In anticipation of this change in demand, the CAC processor may identify when the demand is likely to change, and can dynamically reallocate the bandwidth in advance of the actual change in demand.

If a reallocation is desired, then the CAC processor may return to step 401, and reestablish the various bandwidth groups and/or allocations, as desired. If no reallocation is desired, then the processor may return to step 407, and look for more admission requests.

Figure 5:
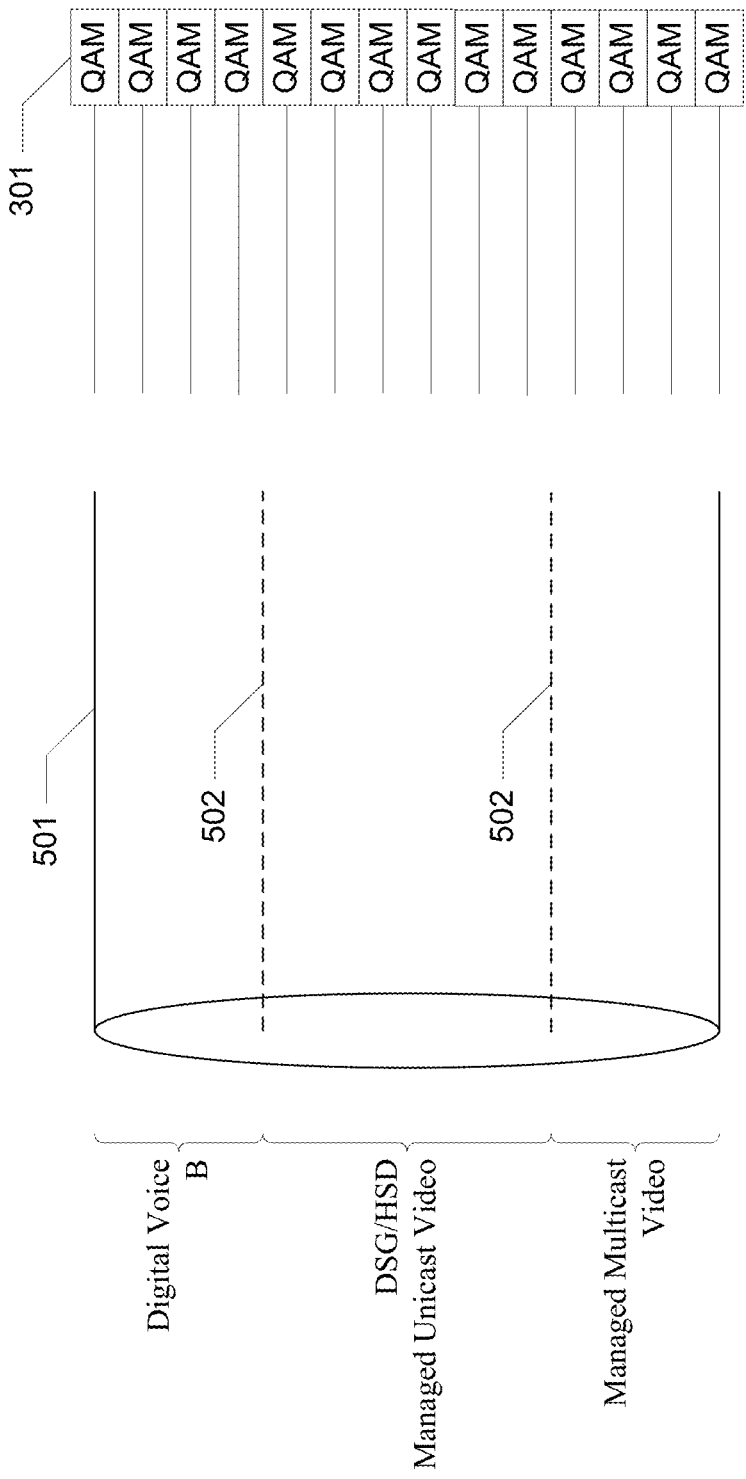
FIG. 5 illustrates an example bandwidth allocation.

The FIG. 3 example bandwidth allocation above is just one example, and variations may be made. For example, there may be more (or fewer) traffic groups and boundaries. In another embodiment, these bandwidths may be combined into a single overall bandwidth. FIG. 5 illustrates such an example, in which the various QAMs 301 have their lines grouped into a single bandwidth 501. The single bandwidth may then have several internal boundaries 502 that separate the allocations for different data types. In the illustrated example, unicast video may be grouped with the DSG/HSD allocation. In such an example, the digital voice traffic may have its own single channel bandwidth requirements (e.g., minimum bandwidth B), and the managed video services and other data (e.g., HSD/DSG) may have their limits and allocations adjusted to ensure that the digital voice allocation remains at B or greater. So, for example, an increase in the managed unicast demand may result in a decrease in the managed multicast video allocation, to keep the digital voice unchanged (or at least greater than B).

Alternatively, the overall bandwidth being allocated may be from just a single QAM. For example, the total available bandwidth of a single QAM or a single QAM channel may be subdivided and allocated in the manner described above, and the same may be done for each of a plurality of QAMs that may reside at the local office 103. In some embodiments, the traffic type allocations may vary with different service groups, or groups of devices that share the resources of a single QAM or interface 104. For example, a group of cable modems in a neighborhood may receive the same channels offered by a single QAM at their local office 103. This "DOCSIS pipe" may be subdivided to have the traffic groups discussed above.

The management and control to implement the FIG. 5 allocation may still follow the general approach described above with respect to FIGS. 4a&b.

The discussion above has used the downstream direction as the example direction, but similar techniques may be applied in the upstream direction as well. For example, upstream channels may be grouped together as a single bandwidth, similar to the FIG. 5 single bandwidth.

As noted above, an advantage to having allocations is the ability to preserve minimum qualities of service. In some embodiments, the allocation minimums may be allowed to be broken according to a prioritized scheme. For example, if digital voice is considered to be a higher priority than managed multicast video, then the CAC processor may allow the digital voice allocation to borrow bandwidth from the managed multicast video allocation, even if it means taking the managed multicast video allocation below its stated minimum. This may be used in limited situations (e.g., this ceding of bandwidth might only be granted to one traffic group, or only to groups identified as having a higher priority than the managed video's priority). Also, a particular allocation such as the managed multicast video allocation may include multiple minimum values, such as a "hard" minimum and a "soft" minimum. The soft minimum may be enforced generally against bandwidth demands by other services, but if the higher priority digital voice allocation requires more, then the CAC may revert to a lower "hard" bandwidth minimum for the managed multicast video service, and grant some of the managed video service's allocation to the pre-empting digital video service, and only enforcing the managed multicast video service's hard minimum against other requests. Various priorities may be established for this type of situation (e.g., traffic type A can take some of traffic type B, down to B's hard minimum, but other traffic types must honor the higher, "soft" minimum). The discussion above addresses minimums, but similar approaches may be taken for maximum values, with two different maximum values. Also, taking a service below its soft minimum may result in some initial types of data traffic management. For example, if managed multicast video data traffic is pushed to be below its soft minimum but not its hard minimum, then the managed multicast video data traffic may be partially restricted. For example, certain types of managed multicast video data traffic (such as upstream user commands) may be delayed by a predetermined amount of time, or placed in a best efforts queue that results in slower delivery than normal. If the hard minimum is reached, then these types of traffic might be blocked or dropped altogether. To assist in enforcing these restrictions, the CAC processor may send event messages to sources of the affected data (e.g., sources of managed multicast video), informing them that the soft or hard minimum for their data traffic has been reached. Those sources, in turn, may adjust their own behavior to minimize or halt their further traffic until more bandwidth is available.

In some embodiments, the bandwidth reservations above may be used to reserve bandwidth for managed video traffic, and preserve the managed video traffic allocation against usage by unmanaged data traffic and by other managed data sources that are not video. For example, the CAC processor may ensure that 100 Mbps of bandwidth is available for managed IP video multicasts, and that other managed data (e.g., a voice call service offered by the same entity who operates the CAC processor, and which is part of the same network as the managed video source), as well as all unmanaged sources of data, may be prevented from consuming any of the bandwidth allocated to the managed IP video multicast service. In some embodiments, unmanaged data may share a single common portion of bandwidth, while managed data sources may each be given a different allocation of bandwidth.

The reservation may also extend to different types of managed video. For example, different managed video sources may each be allocated their own reserved bandwidth. Different video qualities, such as high-definition, super-high definition, standard definition and mobile may each be granted different amounts of bandwidth.

In some embodiments, data packets from different sources may be subject to different types of CAC processor treatment. For example, data packets from managed sources may be inspected to identify codes that indicate the data type, while the CAC processor may not look for such codes in data packets that originate from unmanaged sources.

The discussion herein refers to data being managed based on their source. The management may also be carried out based on the data's destination. For example, data sent to a managed video service may be given an allocation that is different from data sent to a managed voice service.

Figure 6:
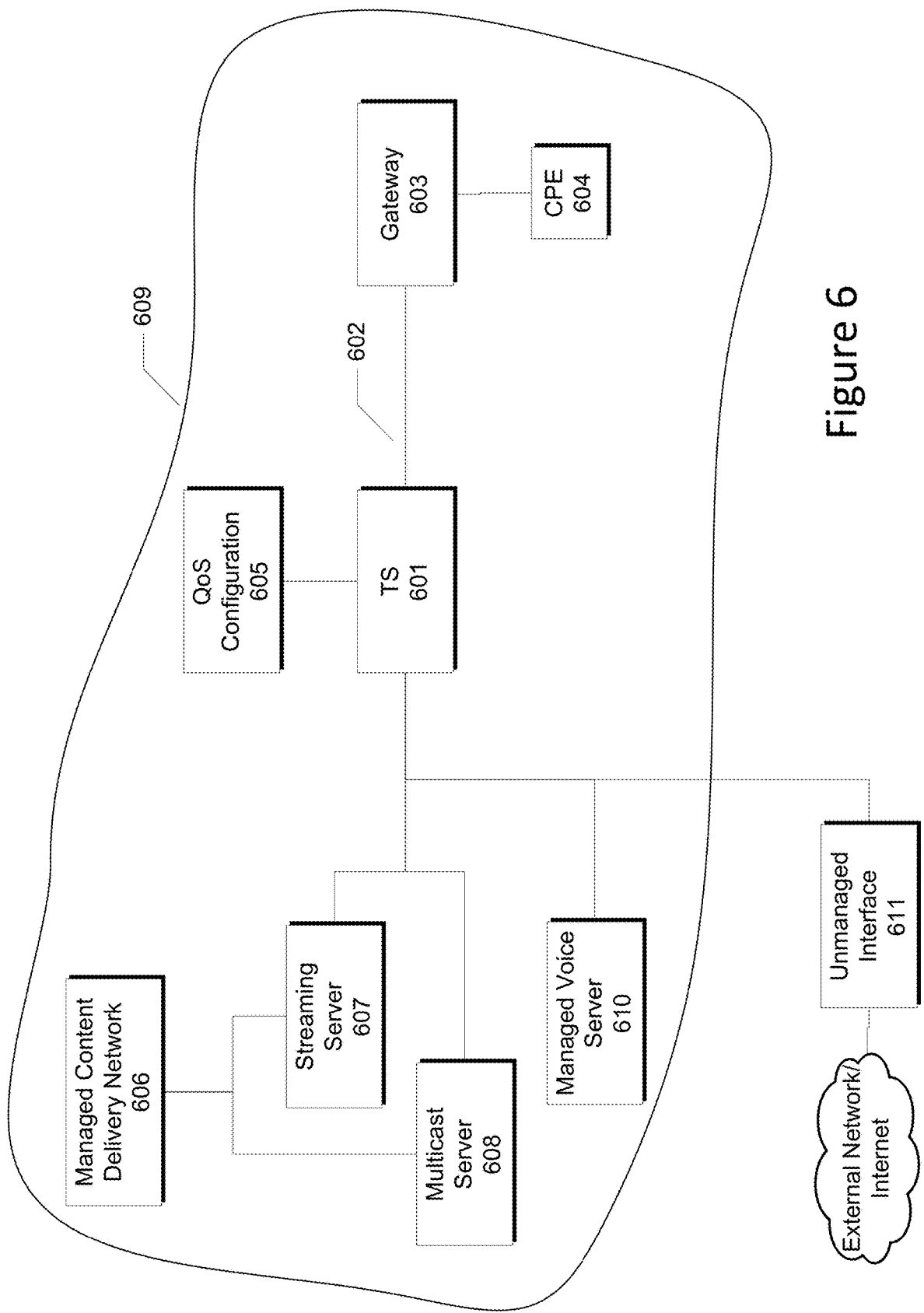
FIG. 6 illustrates an example data architecture

FIG. 6 illustrates an example data architecture, which may be used to implement the features described herein. There may be a termination server 601, which may contain the interface 104 and CAC computing device 302 discussed above. The termination server 601 may ultimately control access to the bandwidth available over the connection 602, which may be one or more wired lines and/or wireless links 101. One or more gateways 603 may be located at the other end of the connection 602, and the gateways 603 may service various consumer premise equipment 604. The gateways 603 and equipment 604 may be, for example, the interface 120 and devices 112-116 discussed above.

A quality of service (QoS) configuration server 605 may provide the termination server 601 with parameters regarding how the various transmission flows should be established, and may help enforce the bandwidth allocations discussed herein. A managed content delivery network 606 may contain a plurality of computing devices that offer managed content, such as managed video content. The network 606 may include video servers that provide the various movies, television programs and other video that a user may request, and can supply that to a streaming server 607 and/or multicast server 608, which can be a computing device configured to establish, maintain and tear down video transmission streams that are supplied to termination server 601 for ultimate delivery to the user. The streaming server 607 may supply IP unicast streams of content, while the multicast server 608 may provide IP multicast streams of content. The managed content delivery network 606, streaming server 607 and multicast server 608 may be part of a managed network 609, and their data may be considered managed because it is subject to control of the QoS configuration 605 and the CAC device in the termination server 601. For example, the network 606 may grant the CAC device permission to inspect packet contents and to make bandwidth allocation determinations affecting the delivery of the network 606's packets based on the packet inspection. This permission may be an express grant carried with the packets, or it may simply be a contractual grant due to a relationship between the owner of the network 606 and the termination server 601 (and CAC device), or they may all be owned by the same entity.

The managed network 609 may also include one or more managed voice servers 610, which can offer voice and telephony services to users. The server 609 may be managed because it has also granted the CAC device permission to control packet delivery based on the data type in the packets. The termination server 601 may also be connected to an unmanaged content interface 611, which may be an Internet server that offers connectivity to other services on the Internet. Those other services may be considered unmanaged, as they are not controlled by the CAC device, and the CAC device may be configured to avoid inspecting the packets from those servers for data type identifiers.

Having thus described a few particular embodiments, various alterations, modifications, and improvements will readily occur to those skilled in the related arts. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. This patent is limited only as defined in the following claims and equivalents thereto.

The invention claimed is:

1. A method comprising:
    determining an available amount of a total bandwidth on a network;
    allocating a first portion of the available amount of the total bandwidth for a first traffic group;
    allocating a second portion of the available amount of the total bandwidth for a second traffic group;
    receiving, from a device, a request to transmit content of the first traffic group;
    selecting the first portion based on the request;
    determining whether the selected first portion has sufficient allocated bandwidth to service the request;
    determining, based on the selected first portion not having sufficient allocated bandwidth to service the request, to redistribute the total bandwidth between the first traffic group and the second traffic group;

allocating, based on a determination that the total bandwidth is to be redistributed, a modified first portion of the total bandwidth to the first traffic group and a modified second portion of the total bandwidth to the second traffic group; and delaying delivery of packets of a first data traffic type based on a determination that actual data usage by the first traffic group is below a first minimum bandwidth allocation level and above a second minimum bandwidth allocation level.

2. The method of claim 1, further comprising:
establishing, for a multicast transmission from the first traffic group and based on the available amount of the total bandwidth on the network, a first minimum bandwidth allocation level and a second minimum bandwidth allocation level, wherein the first minimum bandwidth allocation level is higher than the second minimum bandwidth allocation level.

3. The method of claim 1, wherein one or more of the modified first portion or the modified second portion is determined based on actual bandwidth usage of the selected first portion.

4. The method of claim 1, wherein the selecting is based on:
a network address of the device;
a network address of a receiving device associated with the request; or
a data traffic type of the request and the first traffic group.

5. The method of claim 1, wherein the selecting is based on:
classifying, based on a comparison of stored data and data in the request, the first traffic group.

6. The method of claim 5, wherein the request is classified into the first traffic group and wherein the determining to redistribute the total bandwidth between the first traffic group and the second traffic group is based on one or more of:
a maximum bandwidth allocation of the first traffic group; or
a minimum bandwidth allocation of the second traffic group.

7. The method of claim 1, further comprising:
denying delivery of packets of the first data traffic type based on a determination that actual data usage by the first traffic group is below the second minimum bandwidth allocation level, wherein the first minimum bandwidth allocation level is higher than the second minimum bandwidth allocation level.

8. A method comprising:
determining an available amount of a total bandwidth on a network;
allocating a first portion of the available amount of the total bandwidth for a first traffic group;
allocating a second portion of the available amount of the total bandwidth for a second traffic group;
receiving a request from a device to use the first portion of the available amount of the total bandwidth;
selecting the first portion based on the request;
determining whether the selected first portion has sufficient allocated bandwidth to service the request;
based on a determination that the selected first portion does not have sufficient allocated bandwidth to service the request, determining to redistribute the total bandwidth between the first traffic group and the second traffic group;
based on a determination that the total bandwidth is to be redistributed, allocating a modified first portion of the total bandwidth to the first traffic group and a modified second portion of the total bandwidth to the second traffic group; and delaying delivery of packets of a first data traffic type based on a determination that actual data usage by the first traffic group is below a first minimum bandwidth allocation level and above a second minimum bandwidth allocation level.

9. The method of claim 8, wherein one or more of the modified first portion or the modified second portion is determined based on an actual bandwidth usage of the first portion.

10. The method of claim 8, further comprising:
granting the request.

11. The method of claim 8, wherein the selecting the first portion is based on one or more transmission characteristics of the request.

12. The method of claim 11, wherein the one or more transmission characteristics comprise a content type, and wherein the determining whether the selected first portion has sufficient allocated bandwidth to service the request comprises analyzing a priority assigned to the content type.

13. The method of claim 8, wherein the selecting the first portion is based on whether a network address of the device is assigned to the first traffic group.

14. An apparatus comprising:
one or more processors; and
non-transitory memory storing instructions, that when executed, cause:
determining an available amount of a total bandwidth on a network;
allocating a first portion of the available amount of the total bandwidth for a first traffic group;
allocating a second portion of the available amount of the total bandwidth for a second traffic group;
receiving a request from a device to use the first portion of the available amount of the total bandwidth;
selecting the first portion based on the request;
determining whether the selected first portion has sufficient allocated bandwidth to service the request;
based on a determination that the selected first portion does not have sufficient allocated bandwidth to service the request, determining to redistribute the total bandwidth between the first traffic group and the second traffic group;
based on a determination that the total bandwidth is to be redistributed, allocating a modified first portion of the total bandwidth to the first traffic group and a modified second portion of the total bandwidth to the second traffic group; and
delay delivery of packets of a first data traffic type by a predetermined amount of time based on a determination that actual data usage by the first traffic group is below a first minimum bandwidth allocation level and above a second minimum bandwidth allocation level.

15. The apparatus of claim 14, the instructions, when executed, cause:
granting the request.

16. The apparatus of claim 14, wherein the selecting the first portion is based on one or more transmission characteristics of the request.

17. The apparatus of claim 16, wherein the one or more transmission characteristics comprise a content type, and wherein the determining whether the selected first portion has sufficient allocated bandwidth to service the request comprises determining a priority assigned to the content type.

18. The apparatus of claim 14, wherein the selecting the first portion is based on determining, based on a network address of the device, whether the network address is assigned to the first traffic group.

\* \* \* \* \*